United States Patent
Kupreev et al.

(10) Patent No.: US 9,571,471 B1
(45) Date of Patent: Feb. 14, 2017

(54) SYSTEM AND METHOD OF ENCRYPTED TRANSMISSION OF WEB PAGES

(71) Applicant: AO Kaspersky Lab, Moscow (RU)

(72) Inventors: Oleg V. Kupreev, Moscow (RU); Vladimir A. Kuskov, Moscow (RU); Alexey A. Samuleenkov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/936,932

(22) Filed: Nov. 10, 2015

(51) Int. Cl.
*G06F 17/00* (2006.01)
*G06F 7/04* (2006.01)
*H04L 29/06* (2006.01)
*G06F 17/30* (2006.01)

(52) U.S. Cl.
CPC ..... *H04L 63/0435* (2013.01); *G06F 17/30893* (2013.01); *H04L 63/0442* (2013.01); *H04L 63/0281* (2013.01); *H04L 63/04* (2013.01); *H04L 63/0428* (2013.01)

(58) Field of Classification Search
CPC ... H04L 63/0281; H04L 63/04; H04L 63/0428
USPC ...................... 713/168; 726/12, 26
See application file for complete search history.

(56) References Cited

U.S. PATENT DOCUMENTS

| | | | |
|---|---|---|---|
| 2003/0159030 A1 | 8/2003 | Evans | |
| 2004/0003259 A1* | 1/2004 | Chang | H04L 63/083 713/182 |
| 2005/0273616 A1* | 12/2005 | Nishio | G06F 21/608 713/176 |
| 2010/0088396 A1* | 4/2010 | Armerding | H04L 63/029 709/218 |
| 2013/0091350 A1* | 4/2013 | Gluck | H04L 63/0281 713/153 |
| 2013/0254855 A1* | 9/2013 | Walters | G06F 21/60 726/5 |
| 2014/0032686 A1* | 1/2014 | Wirth | H04L 51/00 709/206 |
| 2014/0068269 A1* | 3/2014 | Zhou | G06F 21/10 713/171 |
| 2014/0245002 A1 | 8/2014 | Hayward | |

(Continued)

FOREIGN PATENT DOCUMENTS

JP 2014131197 A 7/2014

OTHER PUBLICATIONS

European Search Report for EP 15 20 2316 Mailed Apr. 4, 2016.

*Primary Examiner* — Arvind Moorthy
(74) *Attorney, Agent, or Firm* — Arent Fox LLP; Michael Fainberg

(57) ABSTRACT

Disclosed are systems and method for encrypted transmission of web pages. One exemplary method comprises: receiving, by a proxy server, a web page requested by a user device; analyzing, by a hardware processor of the proxy server, the received web page to identify code of elements of the web page; selecting one or more identified elements of the web page for encryption; encrypting, by the hardware processor, the code of the one or more selected elements; generating, by the hardware processor, a script containing the encrypted code of the one or more selected elements; modifying the web page, by the hardware processor, by replacing in the web page the code of the one or more selected elements with the script containing the encrypted code of said one or more selected elements; and transmitting, by the proxy server, the modified web page to the user device.

20 Claims, 5 Drawing Sheets

(56) References Cited

U.S. PATENT DOCUMENTS

2015/0082416 A1* 3/2015 Strassmann ............ G06F 21/60
726/12

* cited by examiner

SYSTEM AND METHOD OF ENCRYPTED TRANSMISSION OF WEB PAGES

FIELD OF TECHNOLOGY

The present invention relates generally to the field of computer security, and, more specifically, to systems and methods for encrypted transmission of web pages.

BACKGROUND

Due to the ever growing number of computer threats (such as malware, hacker attacks, etc), electronic payment systems, Internet banking services, and other Internet services working with confidential data require an increased level of protection for data during transmission between a user's application and a network server. Encrypted communication protocols (such as the protocols HTTPS, SSL/TLS) are traditionally used to provide protection for the data being transmitted (such as web pages) over telecommunication networks.

However, some malicious software, which is installed on a user's computer, is able to intercept the user's data prior to its transmission by the protected communication protocol. For example, the banking Trojan horses "Zeus" and "SpyEye" analyze the content of a web page received from a server and modify it immediately prior to its display in the browser with the help of mechanisms for intercepting of API (application programming interface) calls.

Current data protection techniques are often ineffective in combating such malware. Therefore, there is a need to improve security of web pages transmitted to user devices.

SUMMARY

Disclosed are systems and method for encrypted transmission of web pages to user devices. An exemplary method for secure transmission of web pages comprises: receiving, by a proxy server, a web page requested by a user device; analyzing, by a hardware processor of the proxy server, the received web page to identify code of elements of the web page; selecting one or more identified elements of the web page for encryption; encrypting, by the hardware processor, the code of the one or more selected elements; generating, by the hardware processor, a script containing the encrypted code of the one or more selected elements; modifying the web page, by the hardware processor, by replacing in the web page the code of the one or more selected elements with the script containing the encrypted code of said one or more selected elements; and transmitting, by the proxy server, the modified web page to the user device.

In one exemplary aspect, modifying the web page, includes modifying a Document Object Model (DOM) of the web page.

In one exemplary aspect, encrypting the code of one or more selected elements of the web page, includes using an asymmetric encryption method.

In one exemplary aspect, encrypting the code of one or more selected elements of the web page using an asymmetric encryption method, includes encrypting the code of the one or more selected elements of web page using a public key of an application of the user device.

In one exemplary aspect, encrypting the code of one or more selected elements of the web page, includes using a symmetric encryption method.

In one exemplary aspect, selecting one or more identified elements of the web page for encryption includes: selecting one or more of (i) user input elements and (ii) output elements containing confidential user data.

In one exemplary aspect, the method further includes: transmitting, by the proxy server, to the user device a public key of a remote web server for use by the user device to encrypt user input data on the web page.

An exemplary system for secure transmission of web pages comprises: a proxy server having a hardware processor configured to: receive a web page requested by a user device; analyze the received web page to identify code of elements of the web page; select one or more identified elements of the web page for encryption; encrypt the code of the one or more selected elements; generate a script containing the encrypted code of the one or more selected elements; modify the web page by replacing in the web page the code of the one or more selected elements with the script containing the encrypted code of said one or more selected elements; and transmit the modified web page to the user device.

Another exemplary method for secure transmission of web pages comprises: receiving, by a user device, a public key of a remote web server; encrypting, by a hardware processor of the user device, using the received public key, a request to the web server to provide a web page to an application of the user device; transmitting, by the user device, the encrypted request to the web server; receiving, by the user device, the requested web page containing a script containing encrypted code of one or more elements of the web page; executing the script and decrypting, by the hardware processor, using a private key of the application of the user device, the encrypted code of one or more elements of the web page; and modifying the web page, by the hardware processor, by replacing the script containing encrypted code of one or more elements of the web page with the decrypted code of said one or more elements.

In one exemplary aspect, receiving a public key of a remote web server includes: receiving, by the user device, a script containing a public key of the web server; and executing, by the hardware processor, the script to retrieve the public key.

In one exemplary aspect, the encrypted code of one or more elements of the web page is encrypted using public key of the application of the user device.

In one exemplary aspect, the method further comprises displaying the modified web page on a display of the user device.

Another exemplary system for secure transmission of web pages comprises: a user device having a hardware processor configured to: receive a public key of a remote web server; encrypt, using the received public key, a request to the web server to provide a web page to an application of the user device; transmit the encrypted request to the web server; receive the requested web page containing a script containing encrypted code of one or more elements of the web page; execute the script and decrypting using a private key of the application of the user device, the encrypted code of one or more elements of the web page; and modify the web page by replacing the script containing encrypted code of one or more elements of the web page with the decrypted code of said one or more elements.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION

Example aspects of the present invention are described herein in the context of a system, method, and computer program product for encrypted transmission of web pages to user devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
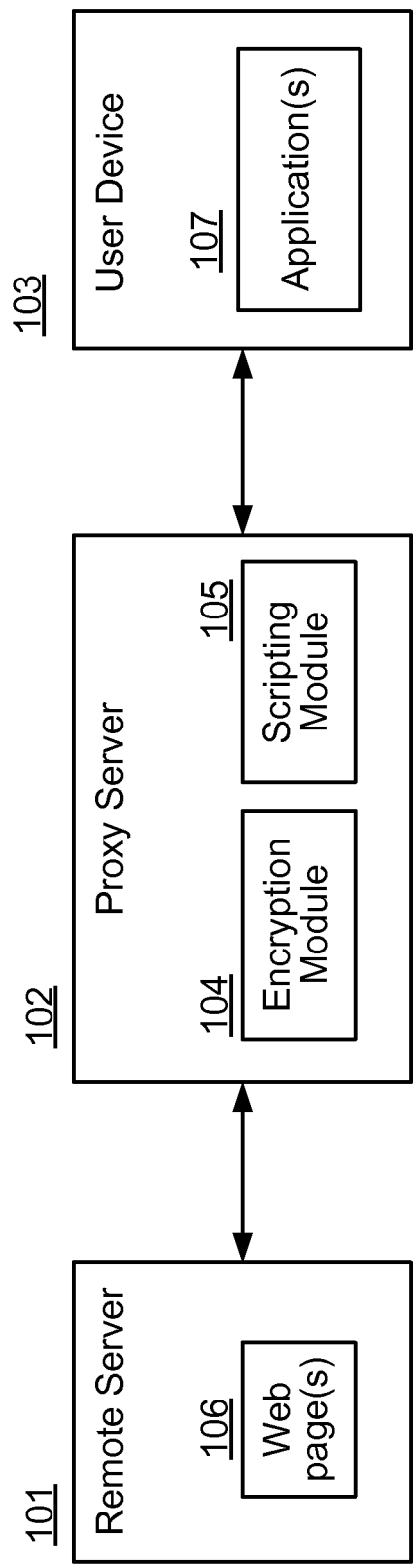
FIG. 1 illustrates one exemplary system for encrypted transmission of web pages to user devices using a proxy server.

FIG. 1 shows one exemplary system for encrypted transmission of web pages to user devices. The system includes a remote server 101, which hosts a website containing one or more web pages 106. The remote server 101 is connected to a proxy server 102, which in turn configured to receive the web page 106 from the remote server 101, modify the web page by encrypting at least a portion thereof using encryption module 104, and transmit the modified web page to an application 107 (e.g., an Internet browser, an Internet banking application, etc.) on a user device 103.

In one exemplary aspect, the proxy server 102 includes an encryption module 104 configured to identify elements of the web page 106 and encrypt the program code of one or more selected web page elements. The web page elements may include, but not limited to: the text field, the "button" field, the data entry field, the link to a file (audio, video, graphics), the hyperlink, and other known HTML, XML or other elements of web pages.

In one exemplary aspect, the proxy server 102 also includes a scripting module 105 configured to create a script (e.g., JavaScript code or the like), modify the web page by adding the script thereto, and delete the code of the web page elements which have been encrypted. The script may contain the following code: a code of the elements of the web page encrypted by the encryption module 104; and a code enabling decryption of the encrypted code of the web page elements when executed on the user device 103.

In one exemplary aspect, the proxy server 102 may contain a template of the script, containing the code for decryption of the encrypted data contained in the script. Thus, when creating the script, the proxy server 102 can make use of the template, adding to it the encrypted code of the received web page elements.

The web page may be a document in HTML format, which can contain links to files in different formats (text, graphics, audio, video, scripts etc.), databases, and so on.

In one exemplary aspect, the encryption module 104 may contain a list of web page elements needing to be encrypted. The list of elements may be formulated in advance by an administrator or created automatically on the basis of statistics about the web page elements contained in the majority of web pages, or also by using various techniques of DLP (data leak prevention). In one exemplary aspect, the list of elements contains web page elements which must be protected against possible theft by malicious software. For example, the list may contain five text fields, two links to graphics, and also a link to a database.

In one exemplary aspect, the encryption of the code of elements from the list of elements may be done using asymmetrical encryption methods (such as the RSA algorithm). In this case, the remote server 101 previously creates a public and a private key of the remote server, while the application 107 creates a public and a private key of the application 107. Next, the remote server 101 and the application 107 exchange their public keys. The public keys are needed to encrypt the data being transmitted, while the private keys are needed to decrypt the data by the receiving party. In one exemplary aspect, the proxy server 102 may be configured to transmit the public encryption key needed by the application 107 to encrypt a message sent to the proxy server 102. The decryption of the data (the encrypted code of the web page elements) may be done using the private encryption key of the application 107 by executing the script containing the program code enabling decryption of the data.

In yet another exemplary aspect, the encryption of the code of the web page elements may be done using symmetrical encryption (such as the AES algorithm), which is generally faster than asymmetrical encryption. In this case, a secret encryption key is used, designed for both encryption and decryption of data. In one exemplary aspect, the secret encryption key can be created by the remote server 101 and transmitted to the application 107 using asymmetrical encryption. In another exemplary aspect, the secret key can be changed periodically (for example, once a day or when a new browser session is opened).

Figure 2:
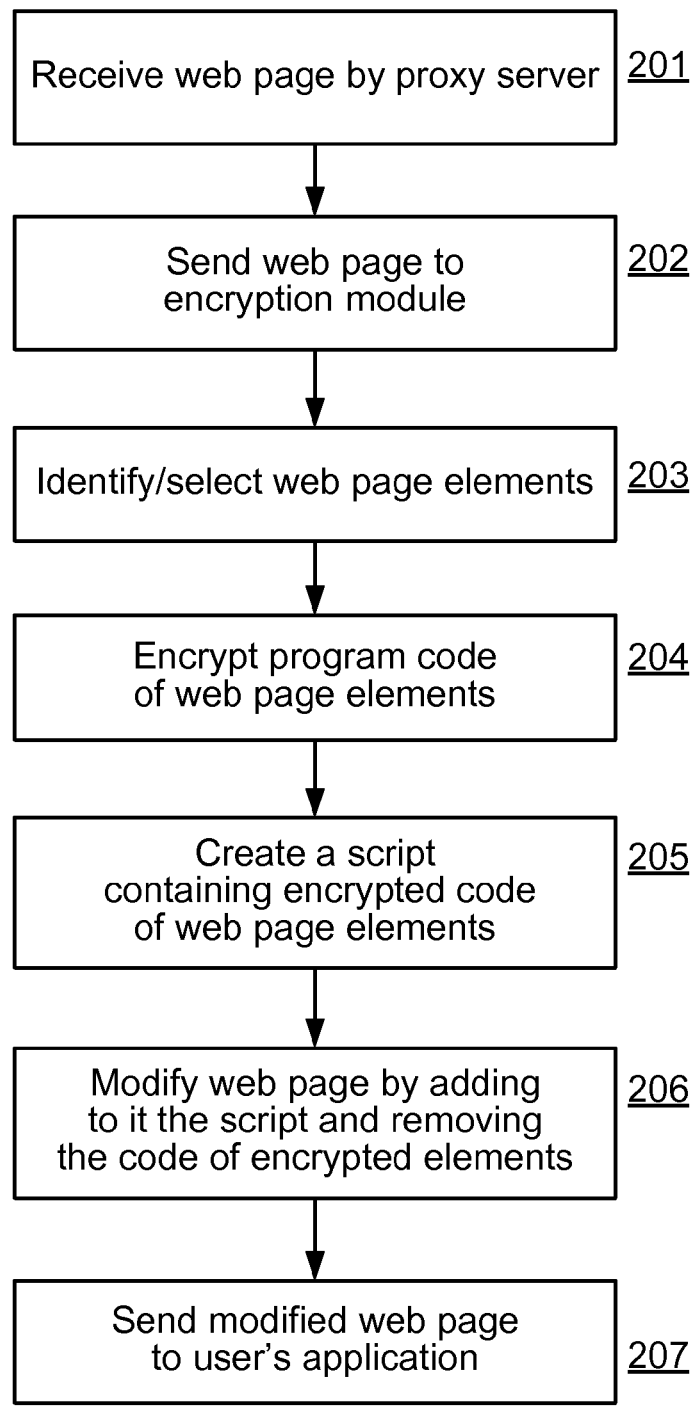
FIG. 2 illustrates one exemplary method of encryption for encrypted transmission of web pages to user devices using a proxy server.

FIG. 2 shows one exemplary method of encryption for encrypted transmission of web pages to user devices. In step 201, the proxy server 102 receives the web page 106 from the remote server 101. Next, in step 202, the proxy server 102 sends the received web page 106 to the encryption module 104. In step 203, the encryption module 104 identifies the elements of in the web page 106 and selects elements for encryption. In one exemplary aspect, all the elements of the web page may be selected for encryption. In another exemplary aspect, only the elements contained in a list of elements residing on the proxy server 102 will be selected for encryption. Next, in step 204, the encryption module 104 performs the encryption of the code of the selected web page elements. In step 205, the scripting module 105 creates a script (e.g., JavaScript code), containing the encrypted program code of the selected web page elements. In step 206, the scripting module 105 modifies the web page 106 by adding the created script to the web page 106 and deleting from the web page 106 the code of the web page elements that have been encrypted. In step 207, the proxy server 102 sends the modified web page 106 to the application 107. In one exemplary aspect, the modifying of the web page 106 may be done by modifying the DOM (Document Object Model) tree of the web page 106.

In one exemplary aspect, in step 204, the encryption of the code of the web page elements from the list of elements may be done using asymmetrical encryption methods. In another exemplary aspect, in step 207, the proxy server 102 may additionally send to the application 107 the public key of the remote server 101, needed by the application 107 to encrypt the message of the application 107 sent to the proxy server 102, and also to encrypt the data being entered by the user in the web page elements.

In another exemplary aspect, the encryption in step 204 may be done using the public encryption key of the application 107, while the application 107 performs the decryption of the modified web page using its private key. The public encryption key of the application 107 may be send to the proxy server 102 in advance. In another exemplary aspect, the encryption in step 204 may be done using symmetrical encryption algorithm. In this case, a single secret key is used both for data encryption and decryption. This secret key may be setup in advance between the application 107 and the proxy server 102.

As an example, the proxy server 102 may receive a web page 106 of an Internet banking website, whose fields contain confidential data (such as bank card data, user's full name, etc.). The encryption module 104 may select, for example, web page elements used for data entry and those containing confidential data, and encrypt the code of the selected elements. The code of the encrypted elements will be removed from the original web page 106 and added to the script in an encrypted form, which in turn will be included in the modified web page 106. Finally, the modified web page 106 will be sent to the application 107.

Figure 3:
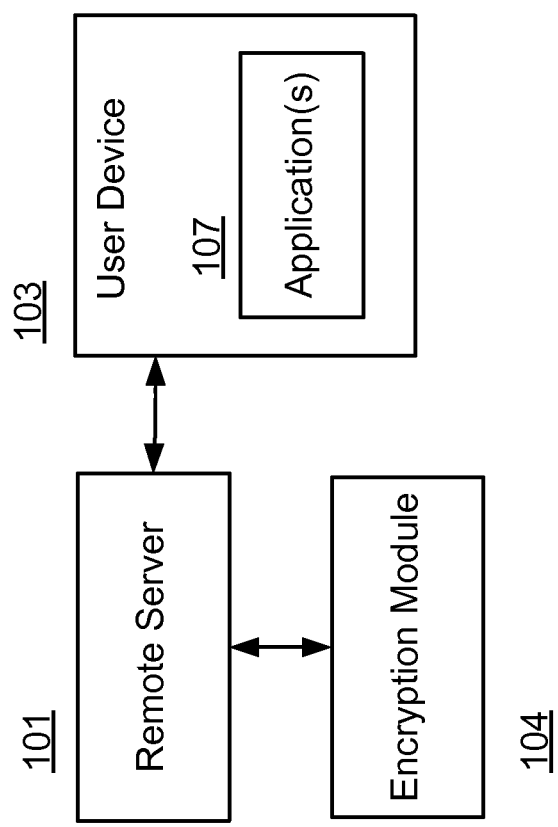
FIG. 3 illustrates another exemplary system for encrypted transmission of web pages to user devices without a proxy server.

FIG. 3 shows an exemplary system for encrypted transmission of web pages to user devices without a proxy server. The system contains a remote server 101 connected to an encryption module 104 and a user device 103 with application 107. The remote server 101 contains a public and a private encryption key of the remote server, while the application 107 contains a public and a private encryption key of the application 107. The encryption keys serve to exchange encrypted messages between the application 107 and the remote server 101 using the encryption module 104. In addition, the application has the public key of the remote server, and the proxy server has the public key of the application, so that the parties can encrypt messages to another party using public key of the respective party. The remote server 101 sends the script containing the public encryption key of the remote server 101 to the application 107. In one exemplary aspect, the script can additionally contain a digital signature to prevent unauthorized modification of the information being transmitted from the remote server 101 by a third party.

The encryption module 104 is configured to encrypt a message intended for the application 107 using the public encryption key of the application 107. The remote server 101 then sends the encrypted message to the application 107.

The application 107 receives the script from the remote server 101 containing the public encryption key of the remote server 101, as well as a message from the remote server 101, encrypted with the public encryption key of the application 107, which contains the web page elements of the web page 106. The application 107 uses public encryption key of the remote server 101 to encrypt the messages being sent to the remote server 101.

The application 107 executes the script and sends a request to the remote server 101, encrypted with the public encryption key of the remote server 101, to receive a web page 106. The encryption of this request may be done by executing a script. The application 107 also sends to the remote server 101 the user's request to receive the code of elements of the web page 106, encrypted with the public key of the remote server 101.

Figure 4:
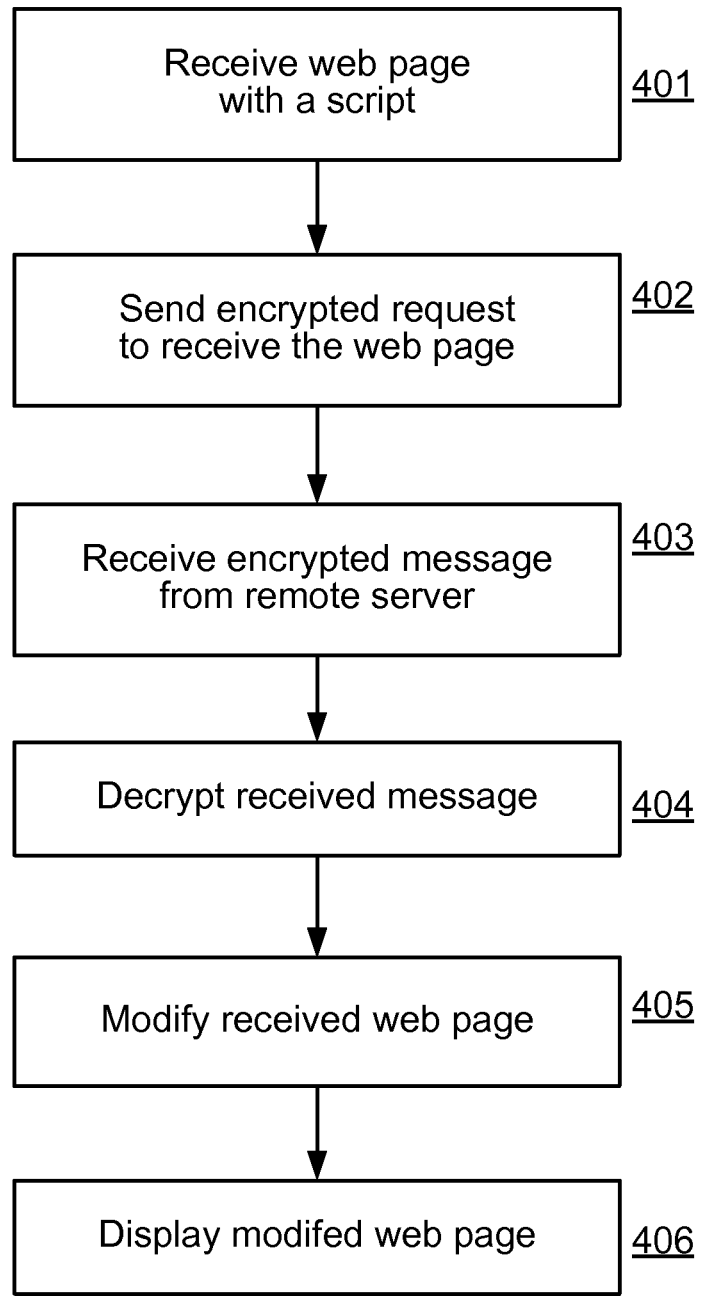
FIG. 4 illustrates another exemplary method for encrypted transmission of web pages to user devices without a proxy server.

FIG. 4 shows an exemplary method for encrypted transmission of web pages to user devices without a proxy server. In step 401, the application 107 receives a web page 106 from the remote server 101, in which a script is contained. The script contains the public encryption key of the remote server 101. In step 402, by executing the received script, the application 107 encrypts a request to receive the web page 106 with the public encryption key of the remote server 101 and sends this request to the remote server 101. Next, in step 403, by executing the script, the application 107 receives a message from the remote server 101, encrypted by the encryption module 104 using the public encryption key of the application 107, which contains the code of selected elements of web page 106. In step 404, by executing the script, the application 107 decrypts the message received with the use of the private encryption key of the application 107. In step 405, by executing the script, the application 107 modifies the received web page 106 adding to it the decrypted code of the web page elements from the decrypted message and displays the modified web page 106 to the user in step 406.

In one exemplary aspect, the system may additionally have a second remote server, on which resides a web page 106. In this case, the remote server 101 will act as a proxy server between the application 107 and the second remote server.

In yet another exemplary aspect, when the remote server 101 performs the functions of the proxy server 102, it receives a web page 106 from the remote server 101 based on request of the application 107 in step 402. Next, the proxy server 102 executes the steps 201-205 of FIG. 2. Finally, in step 403, the application 107 receives the script from the proxy server 102, having sent to it in step 205 the modified web page 106 for the application 107.

Figure 5:
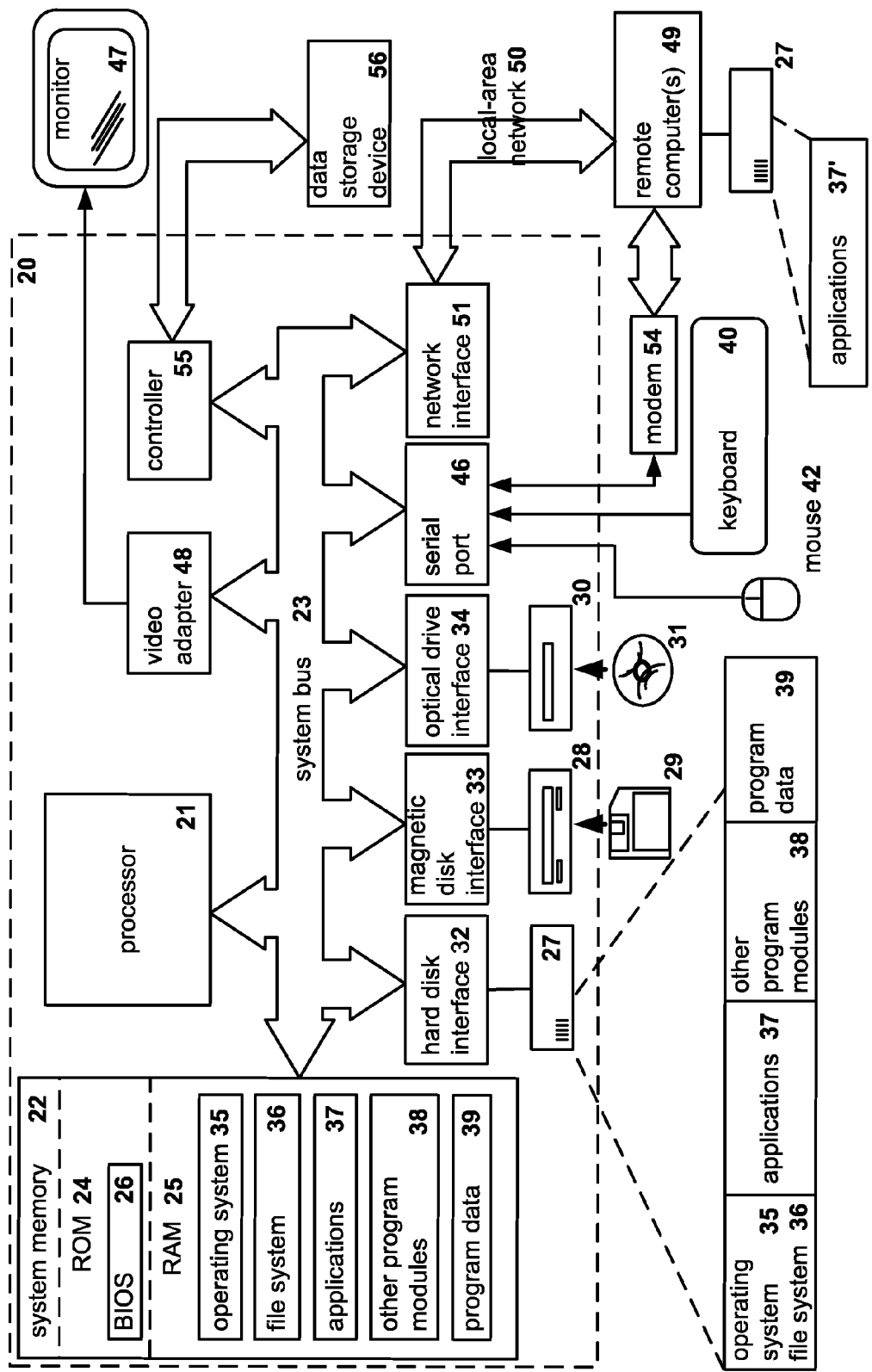
FIG. 5 illustrates an example of a general-purpose computer system by means of which the disclosed aspects of systems and method can be implemented.

FIG. 5 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for secure transmission of web page data, the method comprising:

receiving, by a proxy server, a web page requested by a user device;

analyzing, by a hardware processor of the proxy server, the received web page to identify code of elements of the web page;

selecting one or more identified elements of the web page for encryption from (i) user input elements and (ii) output elements containing confidential user data;

encrypting, by the hardware processor, the code of the one or more selected elements;
generating, by the hardware processor, a script containing the encrypted code of the one or more selected elements;
modifying the web page, by the hardware processor, by replacing in the web page the code of the one or more selected elements with the script containing the encrypted code of said one or more selected elements; and
transmitting, by the proxy server, the modified web page to the user device.

2. The method of claim 1, wherein modifying the web page, includes modifying a Document Object Model (DOM) of the web page.

3. The method of claim 1, wherein encrypting the code of one or more selected elements of the web page, includes using an asymmetric encryption method.

4. The method of claim 3, wherein encrypting the code of one or more selected elements of the web page using an asymmetric encryption method, includes encrypting the code of the one or more selected elements of web page using a public key of an application of the user device.

5. The method of claim 1, wherein encrypting the code of one or more selected elements of the web page, includes using a symmetric encryption method.

6. The method of claim 1, further includes:
transmitting, by the proxy server, to the user device a public key of the remote server for use by an application of the user device to encrypt user input data on the web page.

7. A system for secure transmission of web page data, the system comprising:
a proxy server having a hardware processor configured to:
receive a web page requested by a user device;
analyze the received web page to identify code of elements of the web page;
select one or more identified elements of the web page for encryption from (i) user input elements and (ii) output elements containing confidential user data;
encrypt the code of the one or more selected elements;
generate a script containing the encrypted code of the one or more selected elements;
modify the web page by replacing in the web page the code of the one or more selected elements with the script containing the encrypted code of said one or more selected elements; and
transmit the modified web page to the user device.

8. The system of claim 7, wherein modifying the web page, includes modifying a Document Object Model (DOM) of the web page.

9. The system of claim 7, wherein encrypting the code of one or more selected elements of the web page, includes using an asymmetric encryption method.

10. The system of claim 9, wherein encrypting the code of one or more selected elements of the web page using an asymmetric encryption method, includes encrypting the code of the one or more selected elements of web page using a public key of an application of the user device.

11. The system of claim 7, wherein encrypting the code of one or more selected elements of the web page, includes using a symmetric encryption method.

12. The system of claim 7, wherein the hardware processor is further configured to:
transmit to the user device a public key of the remote server for use by the user device to encrypt user input data on the web page.

13. A method for secure transmission of web page data, the method comprising:
receiving, by a user device, a public key of the remote web server;
encrypting, by a hardware processor of the user device, using the received public key of the remote web server, a request to the web server to provide a web page to an application of the user device;
transmitting, by the user device, the encrypted request to the web server;
receiving, by the user device, the requested web page containing a script containing encrypted code of one or more elements of the web page, wherein encrypted element of the web page include one or more of (i) user input elements and (ii) output elements containing confidential user data;
executing the script and decrypting, by the hardware processor, using a private key of the application of the user device, the encrypted code of one or more elements of the web page; and
modifying the web page, by the hardware processor, by replacing the script containing encrypted code of one or more elements of the web page with the decrypted code of said one or more elements.

14. The method of claim 13, wherein receiving a public key of the remote web server includes:
receiving, by the user device, a script containing a public key of the remote web server; and
executing, by the hardware processor, the script to retrieve the public key of the remote web server.

15. The method of claim 13, wherein the encrypted code of one or more elements of the web page is encrypted using public key of an application of the user device.

16. The method of claim 13, further comprising:
displaying the modified web page on a display of the user device.

17. A system for secure transmission of web page data, the system comprising:
a user device having a hardware processor configured to:
receive a public key of the remote web server;
encrypt, using the received public key of the remote web server, a request to the web server to provide a web page to an application of the user device;
transmit the encrypted request to the web server;
receive the requested web page containing a script containing encrypted code of one or more elements of the web page, wherein encrypted element of the web page include one or more of (i) user input elements and (ii) output elements containing confidential user data;
execute the script and decrypting using a private key of the application of the user device, the encrypted code of one or more elements of the web page; and
modify the web page by replacing the script containing encrypted code of one or more elements of the web page with the decrypted code of said one or more elements.

18. The system of claim 17, wherein receiving a public key of the remote web server includes:
receiving, by the user device, a script containing a public key of the remote web server; and
executing, by the hardware processor, the script to retrieve the public key of the remote web server.

19. The system of claim 17, wherein the encrypted code of one or more elements of the web page is encrypted using public key of an application of the user device.

20. The system of claim 17, wherein the processor is further configured to:

display the modified web page on a display of the user device.

\* \* \* \* \*